United States Patent [19]

Fisher

[11] 4,182,444
[45] Jan. 8, 1980

[54] HEATED CONVEYOR BELT SCRAPER

[75] Inventor: Eugene W. Fisher, Dickinson, N. Dak.

[73] Assignee: General Steel & Supply Co., Dickinson, N. Dak.

[21] Appl. No.: 918,610

[22] Filed: Jun. 23, 1978

[51] Int. Cl.² .............................................. B65G 45/00
[52] U.S. Cl. .................... 198/499; 15/256.5; 198/497; 198/952
[58] Field of Search ............. 198/493, 494, 497, 498, 198/499, 952; 15/250.05, 250.07, 256.5

[56] References Cited

U.S. PATENT DOCUMENTS

| | | | |
|---|---|---|---|
| 337,318 | 3/1886 | Field | 198/952 X |
| 867,739 | 10/1907 | Merrit | 198/499 X |
| 1,793,246 | 2/1931 | Philips | 198/499 X |
| 2,885,069 | 5/1959 | Bowen | 198/497 X |
| 3,795,308 | 3/1974 | Oury | 198/499 |
| 3,815,728 | 6/1974 | Vaughan | 198/499 X |

*Primary Examiner*—James L. Rowland
*Attorney, Agent, or Firm*—Merchant, Gould, Smith, Edell, Welter & Schmidt

[57] ABSTRACT

A scraper blade is provided for a conveyor belt for removing material such as hot asphalt mix which would otherwise tend to stick to the conveyor belt surface. A scraper blade assembly is mounted to a swinging arm which is pivoted to the conveyor frame and positioned near the underside of the discharge end of the conveyor. A blade is mounted transversely to the conveyor belt for scraping material from its surface, and heating elements are provided for heating the blade to prevent material build-up on the scraper. A control system including sensors, a control valve and a control cylinder is provided for pivoting the blade away from the conveyor to allow passage of the conveyor splice without damaging it, or in response to a conveyor belt stoppage.

13 Claims, 2 Drawing Figures

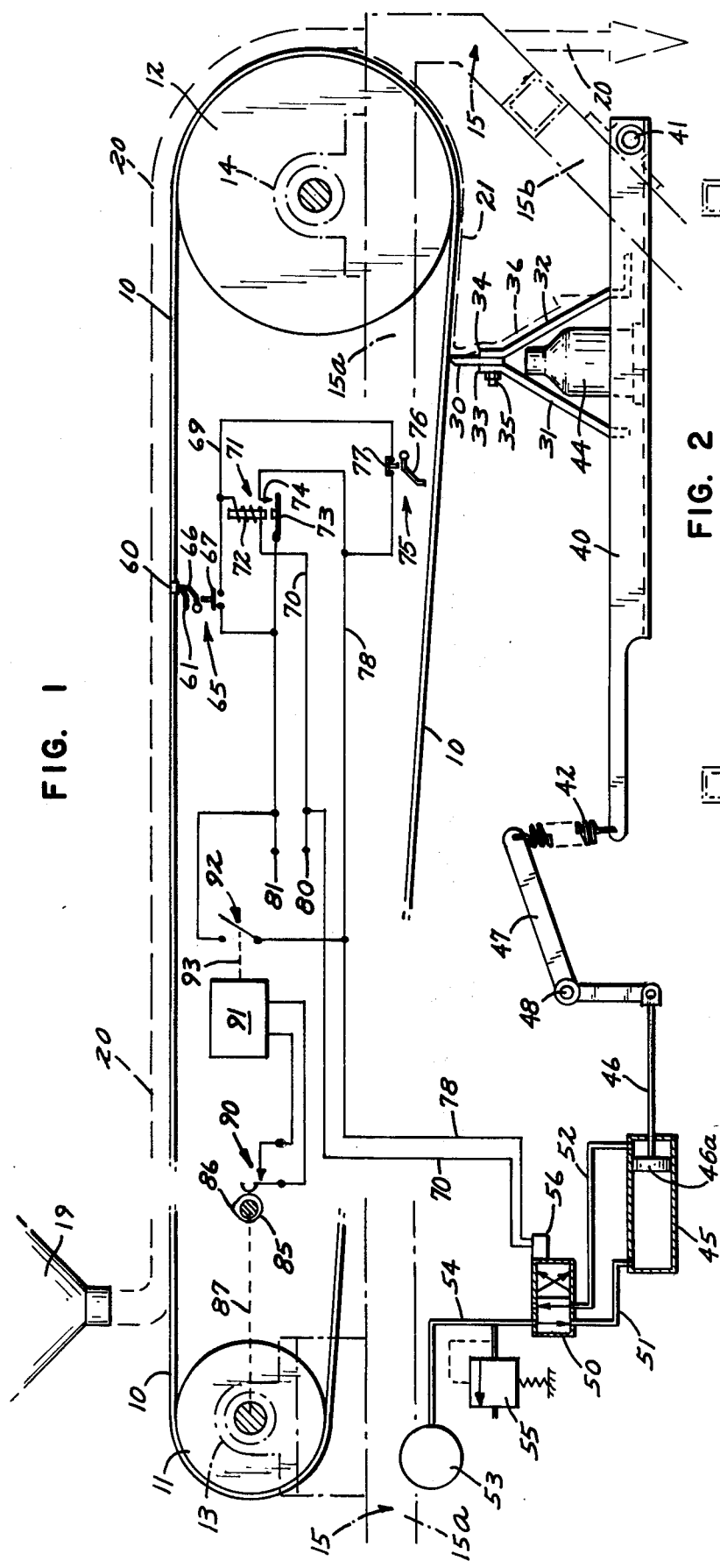

HEATED CONVEYOR BELT SCRAPER

BACKGROUND OF THE INVENTION

The present invention pertains to the field of conveyor belts used for material handling. More specifically, the present invention pertains to a heated scraper blade and controls therefor for removing residual material from a conveyor belt.

In the use of conveyor belts for transferring material from one location to another, problems are sometimes encountered with materials which tend to stick to the conveyor belt. A principal example of this problem is in the transfer of heated asphalt mix of the type used in road building. Typically, the asphalt mix is dumped from a mixing machine to the surface of the conveyor belt at one end, for delivery to a waiting delivery truck at the discharge end of the conveyor. Unfortunately, the hot asphalt mix tends to stick to rubber belt surfaces used for the conveyor belt, and instead of spilling off the end, the material tends to stick to the rubber belt surface and continue on around with the conveyor belt on its return path.

Of course one solution to this problem is to use an articulated steel type conveying track rather than a rubber conveyor belt, but because this solution is rather expensive, it is more common to use a rubber belt and to try to scrape the asphalt off or to simply put up with the problem. The prior art has used many different types of scrapers including stretched wires and blades in an attempt to remove the sticking asphalt from the belt. One problem with the prior art is that the scraping device itself eventually becomes clogged with the asphalt mix sticking to it. Another problem is that there is a metallic splice at some point in the belt which can be damaged when it comes past the scraper. Alternatively, the metallic splice might damage the scraping device.

SUMMARY OF THE INVENTION

In order to overcome these and other problems, the present invention provides a heated scraper blade, movably mounted to the conveyor frame. One or more heating elements are attached for heating the scraper blade to sufficient temperature to prevent sticking or clogging of the asphalt mix on the scraper blade. A control system including sensors, an actuator and linkages is connected for controlling the position of the scraper blade. In normal operation the blade in held against the belt, but when the sensing means senses the approach of the conveyor belt splice, the control system moves the scraper blade away from the conveyor surface momentarily to clear the splice without damaging it. A motion sensor provided in conjunction with the conveyor is connected to the control system to cause the blade to move away from the belt in the event of stoppage of the belt.

BRIEF DESCRIPTION OF THE DRAWING

In the drawing, FIG. 1 is a diagrammatic view, with portions thereof broken away for purposes of clarity, of a conveyor having a heated scraper according to the present invention; and FIG. 2 is a top view of the scraper blade assembly of FIG. 1.

DETAILED DESCRIPTION OF THE PREFERRED EMBODIMENT

In the drawing, reference number 10 designates a conveyor belt which extends around a pair of end pulleys 11 and 12. Because in practice the conveyor may be quite lengthy, it has been broken in FIG. 1 as indicated by the gaps in conveyor 10 so that it may be substantially shortened for purposes of the drawing. End pulleys 11 and 12 are typical but it will be understood that any type of conveyor including multiple pulleys, separate drive and idler pulleys, and tensioning pulleys can be provided as is generally known in the art. In the drawing, pulley 11 is supported by a suitable bearing 13, which in turn is bolted to a portion of frame 15 for the conveyor.

At the discharge end, pulley 12 is supported by a suitable bearing 14 which is also bolted to a portion of frame 15 of the conveyor. Although other frame designs and bearing attachments can be used as is generally known in the prior art, the frame schematically schown in FIG. 1 has a generally horizontal portion 15a to which bearings 13 and 14 are attached, and an angularly downward extending portion 15b to which the scraper is attached as explained hereinafter. The rest of the conveyor frame structure is broken away and not shown in FIG. 1 so that the other components or portions of the invention can be better seen, but it will be understood that the rest of the conveyor frame may be provided as is generally known in the art.

For illustration purposes, a material supply hopper 19 is shown dropping a stream of hot asphalt mix onto conveyor 10. The stream of hot asphalt mix, which is indicated by reference number 20, is conveyed to the right in FIG. 1 along conveyor 10 to the discharge end of the conveyor where most of the material falls off and continues on the path indicated by the arrow to the waiting delivery truck or the like. However, a portion of the hot asphalt mix remains stuck to the rubber conveyor surface and continues on underneath the pulley 12 on the return path for the conveyor. The unwanted sticking material is indicated in broken line and by reference number 21.

The scraper blade is indicated by reference number 30. The blade is preferably a wear resistant steel blade with a cutting or scraping edge made of hardened tool steel similar to the material used for a road grader blade. The blade is preferably approximately $\frac{3}{8}$ inch think, and it has a length corresponding to the width of the conveyor belt. The blade is positioned transversely to the return path of conveyor 10 and is held in position by a pair of angled mounting plates 31 and 32. As seen in FIG. 1, these plates are spaced apart at their lower ends, but come together on either side of the base of scraper blade 30 at their upper ends, where they have flanged edges 33 and 34 which are parallel to and adjacent scraper blade 30. A plurality of bolts 35 may be provided for holding the mounting plates and the scraper blade together.

The lower ends of angled mounting plates 31 and 32 are secured to a pivot arm assembly, which forms the frame for the scraper assembly. A pair of pivot arms 40 are attached by pivot pins 41 to portions of frame 15b on either side of the conveyor, as seen in FIG. 2. Suitable bearings may be provided for the pivot pins. Pivot arms 40 are made of angle members, and angled mounting plates 31 and 32 are secured thereto by any suitable means such as welding. In use, the scraper blade is held against conveyor belt 10 on its return path as shown in FIG. 1.

Heating elements are provided for scraper blade 30. In the preferred embodiment, a plurality of propane or butane burners 44 are provided. Burners 44 are positioned on the pivot arm assembly in the space provided between angled mounting plates 31 and 32. The burners are directed to the converging portion formed by the tops of angled mounting plates 31 and 32, and the exposed lower edge of scraper blade 30. Standard electric ignition controls as are generally known in the art are provided for the burners. When lit, the burners heat the bottom of the scraper blade and the mounting plates, and of course the entire scraper blade becomes heated through conduction. In addition to providing a mounting for blade 30, angled mounting plates 31 and 32 also provide a heat collection or focusing area for the burners so that the maximum amount of heat is collected and directed to the scraper blade. Also, the plates provide a protection for preventing the material which is scraped from the blade from falling into the burners. As indicated in FIG. 1, the sticking material 21 which starts on the return path for the conveyor is scraped off by blade 30 and falls down across blade 32 as indicated by reference number 36. Since scraper blade 30 and also mounting plate 32 are both heated by the burners, the asphalt mix will not stick nor build up on these surfaces to clog the scraper as in prior art scrapers. Instead the material will melt and slide or flow away from the blade area. Of course electric or other heating elements could be used in place of burners 44.

The control system for selectively swinging the scraper blade away from the conveyor will now be explained. The ends of one or both of the pivot arms 40 away from pivots 41 are connected to an actuation linkage to control movement of the blade into or away from contact with the belt. As seen in FIG. 1, the left end of arm 40 connects to a spring 42. Scraper blade 30 can be moved into contact with belt 10 by exerting an upward force on spring 42. This is accomplished by means of actuator 45 and its associated linkage. In the preferred embodiment, actuator 45 comprises an air cylinder having a piston 46a and a piston rod 46 which connects to one arm of a bell crank or link 47. Link 47 is pivoted at 48 to a stationary point which for example might be another part of the frame (not shown). The other end of link 47 connects to spring 42, so that motion of piston rod 46 to the right as shown in FIG. 1 causes the scraper blade to be brought into contact with the belt, while motion of the piston rod to the left in FIG. 1 allows the scraper blade to drop away from the belt.

Air cylinder 45 is controlled by a control valve 50, which connects to air cylinder 45 by means of air lines 51 and 52. A compressor or other suitable source of air pressure 53 is provided. Source 53 provides air under pressure to line 54. A pressure regulator 55 may be provided as is generally known in the art to establish the desired working pressure for the system.

Valve 50 is in turn controlled by a solenoid actuator 56. In the position shown in FIG. 1, valve 50 connects line 54 to line 51, while line 52 passes through valve 50 to vent to the atmosphere. In this position the high pressure in line 54 and 51 moves piston 46 to the right. In the other position of valve 50, as indicated by the crossed arrow symbol, line 54 would be connected to line 52, while line 51 would pass through valve 50 to be vented to the atmosphere. In that position, the high pressure would be applied on the right side of piston 46 of air cylinder 45, allowing the scraper blade to drop away from the belt.

Electrical sensors are provided for detecting the position of the splice of the conveyor belt, and the sensors are connected for operating solenoid 56 as follows.

In FIG. 1, reference number 60 indicates the metal splice or joint commonly used for connecting the ends of a rubber conveyor to form the continuous conveyor belt loop. At a suitable lateral position along splice 60, a cam member 61 is attached. The cam member is preferably on the inside or underside of the conveyor belt so that it is not damaged by material being carried by the belt, but it of course must be placed at a lateral position that will not interfere with the end pulleys or any other pulleys of the conveyor belt system. Cam member 61 may be a small plate, bracket or other protruding member which is used to actuate a switch. A switch 65 is positioned at a suitable location for actuation by cam member 61 when the splice passes the switch. Switch 65 includes an actuating member 66, and a normally open contact 67 which may be moved to complete an electrical circuit between a pair of terminals. Electrical lead 68 connects to one terminal, and electrical lead 69 connects to the other. When cam member 61 moves past the location of switch 65, the cam member moved actuating lever 66 which in turn causes contact 67 to complete the circuit through the switch.

A similar switch 75 is provided adjacent the return path of the conveyor shortly past the location of the scraper blade. Switch 75 is similar to switch 65 in that it has an actuating lever 76, and a contact 77, but contact 77 is a normally closed contact so that the circuit through the switch is ordinarily completed unless actuating lever 76 is rotated upward by passage of cam member 61 to break the circuit. Lead 69 connects to one terminal of switch 75, and a branch of lead 78 connects to the other terminal.

A relay 71 is provided, having a winding 72 which connects to electrical lead 69 and a branch of lead 70. Relay 71 has a movable contact 73 which is connected to a branch of lead 68. A contact 74 is positioned to be contacted by contact 73 when the relay is energized. Contact 74 connects to a branch of electrical lead 78.

Electrical leads 70 and 78 connect to solenoid 56 for operation of the valve. A source of suitable working voltage, either alternating or direct current, is applied to terminals 80 and 81.

A motion sensor is provided for detecting stoppage of the conveyor to enable the control system to pull the hot blade away from the conveyor belt to prevent damage. In the preferred embodiment a wheel 85 having a cam protrusion 86 is mechanically linked as indicated by broken line 87 to one of the mechanical components of the conveyor that rotates when the conveyor is in motion. This could be associated with any end or guide pulley or with the drive to the conveyor. A cam follower switch 90 is positioned adjacent wheel 85 for actuation by cam 86 as it rotates. Switch 90 connects to a delay device 91, which in turn is connected for actuating electrical contact 92, as indicated by broken line 93. Delay device 91 may be a delay relay or solid state device as are generally known. Contact 92 has terminals which connect to branches of leads 68 and 78.

In operation, assuming that the splice 60 is not near the scraper end of the conveyor, the voltage applied to terminals 80 and 81 will not be applied to solenoid 56. Although terminal 80 connects directly to one terminal of solenoid 56, the circuit to terminal 81 is not completed because both relay 71 and switch 65 are open. With solenoid 56 de-energized, valve 50 is in the position shown in the drawing, and the source of pressure is applied to move piston rod 46 to the right as indicated, thus holding the heated scraper blade in contact with the belt. Spring 42 provides the necessary degree of resilience or tension, and means may be provided for adjusting the scraping force if necessary.

When splice 60 approaches the discharge end of the conveyor, or at any other point near the mounting position of the scraper blade if other than at the discharge end, cam member actuates switch 65. When switch 65 is closed, winding 72 of relay 71 is energized, and contact 73 is pulled into contact with contact 74. This completes a circuit through solenoid 56 by means of lead 68, relay contact 73, lead 78, solenoid 56, and lead 70. At the same time, the circuit branch which includes switch 75 acts as a latching circuit to hold relay 71 in its energized condition even after the passage of splice 60 allows switch 65 to open once again. The holding path is established through contact 74, a branch of lead 78 and normally closed contact 77 to relay winding 72.

When solenoid 56 is energized, valve 50 switches states with the result that piston rod 47 air cylinder 45 is drawn to the left, causing clockwise rotation of link 47 and counterclockwise pivoting of pivot arm 40 to bring the scraper blade 30 away from the belt.

It is readily apparent that the physical positioning of switch 65 along the path of the conveyor belt is to be chosen in consideration of the response time of the pivot arm and the actuating assembly, and the operating speed of the belt. In terms of path length along the belt, sensing switch 65 should be mounted far enough in advance of scraper blade 30 to ensure that under all operating conditions the blade will have time to move out of the way before the splice passes, but on the other hand it should not be mounted so far away as to leave an unnecessarily large unscraped area on the belt ahead of the splice.

After splice 60 has passed the location of scraper blade 30, its cam member 61 actuates switch 75, thus opening contact 77. This releases the holding circuit for relay 71, allowing it to drop out to its de-energized state, at the same time breaking the circuit through solenoid 56. This allows valve 50 to return to its original position and pivot arm 40 is pivoted upward bringing scraper blade 30 back in contact with the belt.

In the event of stoppage of the conveyor belt, solenoid 56 is energized to pull the blade away from the belt. As long as the belt keeps moving switch 90 keeps getting actuated by cam 86, sending pulses to delay device 91, thus resetting it. If no reset pulses are received in a predetermined period of time selected to be somewhat longer than the rotation period of wheel 85, delay device 91 closes contact 92 completing the circuit to solenoid 56. Other types of motion sensors including magnetic switches could of course be used. Also, a switching network connected to the main power switch for the drive motor in case of an electrically driven conveyor could be coupled to solenoid 56 to achieve this function. Alternatively, the air compressor for energizing the air cylinder could be driven off a pulley for the conveyor, so that if it stopped, air pressure would be lost and the blade could swing away by its own weight.

While the preferred control system is shown in FIG. 1, it will of course be appreciated that if the speed of the belt is known to be constant, a single splice sensing switch can be used in conjunction with a delay relay selected to actuate solenoid 56 for a pre-calculated time interval to ensure that the scrapper blade will be held away from the belt during the passage time for the splice. It will also be apparent to those skilled in the art that instead of a cam member on the splice and a switch having an actuating lever in contact therewith, a magnetic reed switch can be positioned in proximity to the belt for actuation by a magnetic member attached to the splice. It will also be apparent that although an air cylinder, a connecting linkage, and a pivoting arm used in the preferred embodiment, other types of actuators and means for moving the scraper blade into and away from engagement with the belt can be used within the scope of the present invention.

As described above, the present invention provides an improved scraper for a conveyor belt, having a heated blade to prevent build-up of residual scraped material on the blade, and having means for moving the heated blade away from the belt to allow passage of a belt splice or in the event of belt stoppage.

I claim:

1. A scraper for a conveyor belt having a support frame, comprising:
    a scraper blade;
    a scraper blade support and means connecting said scraper blade thereto;
    means for movably connecting said support to the frame of the conveyor for movement thereof between a first position in which the scraper blade is in contact with the conveyor belt and a second position in which the blade is moved away from the conveyor belt;
    means for applying heat to said scraper blade;
    means for sensing the position of a splice of the moving conveyor belt in relation to the position of the scraper;
    actuator means operatively connected to said scraper blade support for movement thereof between said first and second positions; and
    control means connected to said sensing means and said actuator means and operative to move said scraper blade away from said conveyor belt to allow passage of the splice, and further operative to move said scraper blade away from said conveyor belt in the event of stoppage thereof.

2. A scraper for a conveyor belt according to claim 1 wherein said movable scraper blade support is pivotally connected to the conveyor frame for swinging said scraper blade into and away from contact with the conveyor belt.

3. A scraper for a conveyor belt according to claim 1 wherein said means for applying heat comprises a plurality of burners mounted to said scraper blade support generally beneath said scraper blade.

4. A scraper for a conveyor belt according to claim 1 wherein said scraper blade is positioned on the return path of the belt adjacent and generally beneath the discharge end of the conveyor.

5. A scraper for a conveyor belt according to claim 1 wherein said splice sensing means includes a contact member connected to said splice, and a switching element positioned for actuation by said contact member.

6. A scraper for a conveyor belt according to claim 1 wherein said actuator includes an air cylinder.

7. A material handling conveyor belt having scraper for removing residual material adhering thereto, comprising:

a conveyor belt assembly having a frame, a flexible conveyor belt and guide and drive means therefor;

a scraper support arm;

a scraper blade attached to said support arm;

heating means attached to said support arm for heating said scraper blade;

means pivotally mounting said support arm to said conveyor frame for permitting movement of said scraper blade into and away from contact with said conveyor belt;

actuator means connected for movement of said support arm;

sensing means positioned adjacent said conveyor belt for sensing passage of the conveyor belt splice;

motion sensing means for sensing stoppage of the conveyor belt; and control means connected to said splice sensing means, said motion sensing means and said actuator means and operative to cause said scraper blade to be moved away from said conveyor belt during passage of the splice past the location of the scraper, and during stoppage of the conveyor belt.

8. Apparatus according to claim 7 wherein said heating means comprises a plurality of burners.

9. Apparatus according to claim 7 wherein said scraper is positioned on the return path of the conveyor belt generally beneath and adjacent the discharge end thereof.

10. Apparatus according to claim 7 wherein said sensing means includes a contact member mounted on the conveyor splice, and a switch having an actuator lever positioned for engagement by said contact member upon passage of the splice.

11. Apparatus according to claim 7 further including an additional sensing switch positioned along the return path of the conveyor path adjacent the scraper blade, said switch connected to said control means for causing the scraper blade to be moved to the scraping position following passage of the splice.

12. Apparatus according to claim 7 wherein said motion sensing means includes a delay device, a switch connected to the delay device, and a mechanical linkage between the switch and a moving part of the conveyor to cause periodic actuation of the switch while the conveyor is in motion.

13. Apparatus according to claim 7 wherein said scraper support arm includes a pair of angled scraper mounting plates connected along their upper edges to secure the scraper blade, and wherein said heating means comprises a plurality of burners positioned beneath and between said angled mounting plates.

* * * * *